(12) United States Patent
Gulde et al.

(10) Patent No.: US 10,648,468 B2
(45) Date of Patent: May 12, 2020

(54) ADJUSTABLE VANE PUMP

(71) Applicant: Joma-Polytec GmbH, Bodelshausen (DE)

(72) Inventors: Thomas Gulde, Hechingen (DE); Andreas Blank, Hechingen (DE); Michael Walter, Hechingen (DE); Ralph Buehler, Grosselfingen (DE); Torsten Helle, Dusslingen (DE)

(73) Assignee: Joma-Polytec GmbH, Bodelshausen (DE)

( * ) Notice: Subject to any disclaimer, the term of this patent is extended or adjusted under 35 U.S.C. 154(b) by 316 days.

(21) Appl. No.: 15/594,027

(22) Filed: May 12, 2017

(65) Prior Publication Data

US 2017/0328364 A1 Nov. 16, 2017

(30) Foreign Application Priority Data

May 13, 2016 (DE) .................. 10 2016 108 944

(51) Int. Cl.
| | |
|---|---|
| *F03C 2/00* | (2006.01) |
| *F03C 4/00* | (2006.01) |
| *F04C 2/00* | (2006.01) |
| *F04C 14/18* | (2006.01) |
| *F04C 2/344* | (2006.01) |
| *F04C 15/00* | (2006.01) |

(Continued)

(52) U.S. Cl.
CPC .............. *F04C 14/18* (2013.01); *F04C 2/344* (2013.01); *F04C 15/008* (2013.01); *F04C 15/0096* (2013.01); *F01M 1/02* (2013.01); *F01M 2001/0215* (2013.01); *F01M 2001/0238* (2013.01); *F01M 2001/0246* (2013.01); *F04C 14/20* (2013.01); *F04C 2240/30* (2013.01); *F04C 2270/701* (2013.01); *F16H 57/0439* (2013.01)

(58) Field of Classification Search
CPC .......... F04C 2/344; F04C 14/18; F04C 14/20; F04C 15/008; F04C 15/0096; F04C 18/344; F04C 2240/30; F04C 2270/701; F01C 21/0845; F01M 1/02; F01M 2001/0246; F01M 2001/02151; F01M 2001/02381; F16H 57/0439
USPC ............... 418/22, 24, 27, 31, 259, 266–268; 417/213, 219, 220, 222.1
See application file for complete search history.

(56) References Cited

U.S. PATENT DOCUMENTS 2,502,546 A * 4/1950 Adams .................... F04B 49/08
 417/213
3,070,020 A * 12/1962 Pierce ................... F04C 14/226
 417/220

(Continued)

FOREIGN PATENT DOCUMENTS

| DE | 102014226799 | 6/2016 |
|---|---|---|
| DE | 102015209951 | 12/2016 |

*Primary Examiner* — Theresa Trieu
(74) *Attorney, Agent, or Firm* — Bond Schoeneck & King, PLLC; George McGuire (57) ABSTRACT

An adjustable vane pump, in particular an oil pressure pump, with a suction side and a pressure side, with a housing and a rotor supported in the housing so as to be rotatable about a rotor axis. At least one vane is supported for movement in a radial direction. The housing comprises a housing floor and a housing cover transversely to the rotor axis, and an adjustment cage is arranged between the housing floor and the housing cover.

13 Claims, 7 Drawing Sheets

(51) Int. Cl.
*F01M 1/02* (2006.01)
*F04C 14/20* (2006.01)
*F16H 57/04* (2010.01)

(56) References Cited

U.S. PATENT DOCUMENTS

| | | | |
|---|---|---|---|
| 3,813,189 A | 5/1974 | Tompkins | |
| 4,251,192 A * | 2/1981 | Clark | F04C 14/24 417/310 |
| 8,992,184 B2 * | 3/2015 | Wagner | F01B 4/07 417/219 |

* cited by examiner

ADJUSTABLE VANE PUMP

CROSS-REFERENCE TO RELATED APPLICATIONS

This application claims priority to German Application No. 102016108944.3, filed May 13, 2016, the entire disclosure of each of which is incorporated herein by reference.

DESCRIPTION

The invention relates to an adjustable vane pump, in particular an oil pressure pump, with a suction side and a pressure side. The vane pump further has a housing and a rotor, which is supported in the housing so as to be rotatable about a rotor axis and carries at least one vane supported movably in a radial direction. In addition, the housing has a housing floor and a housing cover transversely to the rotor axis. In the housing an adjustment cage is provided that is arranged between the housing floor and the housing cover, encloses the rotor and vane and is adjustable transversely to the rotor axis. The invention further relates to an associated system and to an associated method.

Vane pumps of this kind are used in particular in motor vehicles in the form of oil pressure pumps for engine or transmission oil. The pumps, and their rotors, are driven by a motor, in particular a combustion engine or an electric motor.

Low-pressure pumps, which deliver a high volume flow rate with little back pressure, and high-pressure pumps, which deliver a low volume flow rate with a high back pressure, are already known from the prior art. Low-pressure pumps are used to cool and lubricate a gear unit, while high-pressure pumps charge a pressure accumulator from time to time. In motor vehicles two pumps are accordingly provided for this purpose.

Theoretically there would indeed be the possibility of operating a pump both in a low-pressure and high-pressure state using a variable electric motor. To do this, an exemplary pump would have to be operated at a constant pump volume of 2.857 ccm/rev in low-pressure mode at approx. 5 bar pump pressure by an electric motor at a speed of 3500 rpm and a torque of 0.227 Nm in order to pump 10 l/min of fluid. In high-pressure mode, by contrast, this pump would have to be operated at up to approx. 40 bar pump pressure by an electric motor at a speed of 700 rpm and a torque of 1.819 Nm in order to pump 2 l/min of fluid. However, the curve for the efficiency plotted against the speed of an electric motor is regularly parabolic with a maximum efficiency at a so-called nominal speed. In this respect, in order to operate the pump both in high-pressure mode and low-pressure mode, the motor would have to approach two operating points, one with a high speed and one with a low speed. One of the operating points would consequently have a comparatively low efficiency. In addition, powerful, variable, in particular electric motors of this kind are very expensive. Finally, acoustic reasons provide an argument against the use of such electric motors.

Vane pumps normally have a crescent-shaped pump chamber, which is divided by the at least one vane into pressure chambers. By rotation of the rotor, which is eccentric to the wall surrounding it, a pressure gradient can be provided between the suction side with a suction inlet and a pressure side with the pressure outlet.

An adjustable vane pump is already known from DE 10 2014 203 193 A1. Here the adjustment cage can be adjusted by applying pressure to a pressure chamber with externally supplied pressure means. A control device is provided for this purpose. The size of the crescent-shaped pressure chamber can be adjusted in this case by adjustment of the adjustment cage. This also changes the pump characteristics, in particular the volume conveyed per revolution and thus per minute as well as the maximum applicable pressure. The output of the vane pump can consequently be set as required. The object of the present invention is to remedy the above-mentioned disadvantages of the prior art.

This object is achieved by a vane pump with the features of claim 1. It is accordingly provided that the housing and the adjustment cage delimit a pressure chamber fluidically connected to the pressure side, wherein a restoring element, in particular a restoring spring, is provided, which pushes the adjustment cage into a base end position, wherein the adjustment cage is deflected from the base end position if a limit operating variable in the pressure chamber is exceeded.

The invention is consequently characterized in particular in that no sensors or other control devices are necessary to adjust the adjustment cage. Instead, a switchover of the adjustment cage directly depending on the pressure in the vane pump on the pressure side is brought about by the pressure chamber between the housing and adjustment cage being pressure-connected to the pressure side. The pressure connection can be achieved on the one hand directly by a hole in the housing or adjustment cage. On the other hand, it is also conceivable that the pressure side is connected to the pressure chamber by a line. In any case, the pressure side is directly fluidically connected to the pressure chamber. This means that the fluid conveyed by the pump is conveyed from the pressure side not only to a consumer but also flows into the pressure chamber and builds up pressure in the pressure chamber.

In particular, this creates the possibility of operating a vane pump by means of a motor, in particular an electric motor, both in low-pressure mode (requirement 1) and in high-pressure mode (requirement 2). Nevertheless, due to the fact that the pump volume is variable, the motor can be operated at just one operating point, i.e. a certain speed or a certain torque. The operating point naturally favorably lies in the region of the maximum efficiency and thus the maximum available drive output of the electric motor. The rotor is preferably driven by an electric motor formed as a rotor drive. In this case the rotor drive is advantageously operated in the nominal speed range both when the adjustment cage is in the base end position and when the adjustment cage is deflected from the base end position. The nominal speed range is the speed range of the electric motor in which said motor has its highest efficiency. This is thus the range around the maximum efficiency of the electric motor. Naturally the motor is preferably operated at the nominal speed itself, i.e. with the maximum efficiency. The efficiency also correlates with the available drive torque, so that the motor also has its greatest available drive torque here.

It would also be conceivable to vary the speed of the motor. In particular, a variation in the nominal speed range would be conceivable. The speed of the motor when the adjustment cage is in the base end position could thus differ from the speed of the motor when the adjustment cage is deflected from the base end position. In this regard both a speed variance of the motor and a displacement variance of the vane pump can be provided by the present invention on account of the adjustability of the adjustment housing. Thus two parameters, namely the speed of the motor and displacement of the vane pump, can be changed. Due to this a vane pump can be provided that is particularly advantageous in respect of efficiency, weight and cost.

The electric motor can in particular be an electric motor that is variable by a control device and can be operated in particular at a speed of up to 6000 revolutions per minute. The nominal speed can lie in particular at approx. 3000 to 4000 revolutions/min, in particular at 3500 rpm.

It is particularly preferable if the motor is operated in this case at the same or substantially the same speed both in the base end position of the adjustment cage and when the adjustment cage is deflected from the base end position.

Another advantageous embodiment of the invention provides that the adjustment cage is moved into a deflection end position either abruptly if the limit operating variable is exceeded or continuously as the limit operating variable is increasing. If the adjustment cage is moved continuously as the limit operating variable is increasing, there is therefore a characteristic curve between volume flow rate, applicable pressure and the operating variable. As the operating variable is increasing, a continuous change in the pump characteristics, in particular in the conveying volume of the pump, can consequently be provided by the adjustment cage being gradually moved into the deflection end position as the pressure increases. If the adjustment cage is moved abruptly, however, as the limit operating variable increases, the adjustment cage is moved substantially immediately from the base end position into the deflection end position when the limit operating variable is exceeded.

The speed and the torque of the rotor drive are preferably identical or substantially identical in the base end position and the deflection end position. In particular, the speed can be identical, while the torque increases slightly.

The conveying volume in the base end position is advantageously 1.5 to 4 ccm/rev, in particular 2.4 to 3 ccm/rev, and the conveying volume in the deflection end position is 0.2 to 1.4 ccm/rev, in particular 0.3 to 0.7 ccm/rev, and/or the conveying volume in the base end position is 5 to 20 l/min, in particular 8 to 12 l/min, and the conveying volume in the deflection end position is 0.5 to 4 l/min, in particular 1 to 2 l/min.

The vane pump can preferably apply a pressure of between 30 and 60 bar, in particular of between 35 and 45 bar, to a pressure consumer in the deflection end position. Such a high-pressure state of the pump is suitable in particular for filling an oil pressure accumulator.

An exemplary and particularly preferred embodiment of the invention then results as follows: to cool and lubricate a gear unit, the vane pump is connected to the cooling circuit and operated in low-pressure mode (requirement 1). To this end the pump is operated at a pump volume of 2.857 ccm/rev in low-pressure mode at a pump pressure of up to approx. 5 bar by an electric motor at a speed of 3500 rev/min and a torque of 0.227 Nm in order to convey 10 l/min of fluid. Here the adjustment cage is in the base end position. The speed of 3500 rev/min corresponds here to the nominal speed, at which the electric motor has its maximum efficiency and thus its maximum available drive output.

To charge a pressure accumulator, the vane pump is first connected thereto and no longer to the cooling circuit. On filling of the pressure accumulator, a back pressure builds up, which quickly exceeds a pressure of 5 bar. As the pump pressure increases, the adjustment cage is then deflected into the deflection end position. In the deflection end position the pump volume is 0.571 ccm/rev. The speed is identical to the low-pressure mode and is 3500 rev/min. The torque is virtually identical to the low-pressure mode and is 0.364 Nm. In this high-pressure mode (requirement 2) 2 l/min of fluid is conveyed. The pressure accumulator is filled with fluid up to approx. 40 bar.

An advantageous development of the invention provides that the restoring element extends perpendicularly to the rotor axis and/or the restoring element is supported on the housing on one hand and on the adjustment cage on the other. A particularly simply constructed vane cell can be provided in this way.

The housing and the adjustment cage advantageously delimit the pressure chamber and an opposing restoring element chamber in a sealing manner. Force can consequently be applied to the adjustment cage on both sides, on the one hand by the restoring force of the spring and on the other by the oppositely acting pressure force in the pressure chamber exerted by the fluid located in the pressure chamber. Both chambers are consequently separated from one another in a sealing manner. A particularly simply constructed vane pump can be provided in this way. The restoring force of the restoring element consequently acts in this case against the pressure chamber, while the pressure in the pressure chamber acts against the restoring force.

It is also advantageous if the housing has a pressure outlet connected to the pressure side, wherein the pressure outlet is fluidically connected to the pressure chamber by a fluid line. The fluid line can be led in particular from the pressure outlet through an opening in the housing into the pressure chamber in this case. A particularly simple adjustable vane pump can be provided in this way.

It is particularly preferable if the adjustment cage rests on a first stop on the housing side in the base end position and if the adjustment cage rests on a second stop on the housing side lying opposite the first stop in the deflection end position. The stops can be formed in one piece with the housing. On the other hand, it is also conceivable that the stops are displaceable, in order to change the pump characteristics in this way. The first stop can be provided in this case in particular in the pressure chamber, while the second stop can be provided in particular in the restoring element chamber.

It is further particularly preferable if the adjustment cage is formed cylindrically, in particular so as to be cuboid. The pressure chamber as well as the opposing restoring element chamber can be particularly simply provided and sealed in this way. One cuboid side can delimit the pressure chamber, while an opposing cuboid side delimits the restoring element chamber. The four other cuboid sides can consequently rest on the housing, so that sealed separation of the pressure chamber from the restoring element chamber can be provided. The housing consequently also acts as a guide for the adjustment cage.

In addition or alternatively, the housing can be formed in two parts with a box-shaped base part and a plate-shaped housing cover. The motor can be attached in particular to the housing cover, so that a particularly compactly constructed vane pump is provided.

A particularly preferred development of the invention results from the limit operating variable being formed as a limit pressure. Due to a fluid-tight connection of the pressure side, in particular of the pressure outlet to the pressure chamber, adjustment of the adjustment cage can thus take place directly via the pump pressure.

A particularly preferred development of the invention provides that the limit pressure is between 1 and 7 bar, in particular between 2 and 5.5 bar, and/or that the deflection end position is reached at a pressure of from 0.5 to 10 bar above the limit pressure. If the limit pressure is exceeded, the restoring force of the restoring element is consequently overcome and the adjustment cage is deflected.

As an alternative, the limit operating variable can be formed as a limit temperature, wherein a temperature-sensitive element is provided so that the adjustment cage is deflected counter to the restoring force of the restoring element if the limit temperature is exceeded. A temperature-controlled adjustment of the adjustment housing can also take place in this way.

The object stated at the outset is also achieved by a system comprising a vane pump according to the invention and a switchover valve arranged downstream of the pressure outlet for fluidic connection of the pressure side to a first pressure connection or a second pressure connection, wherein the second pressure connection is connected to a pressure consumer so that, when the pressure side is fluidically connected to the second pressure connection and when the limit operating variable is exceeded, the adjustment cage is deflected from the base end position in the pressure chamber.

In particular, the first pressure consumer can be an oil cooling circuit with in particular a heat exchanger for a gear unit. Furthermore, the second pressure consumer can in particular be an oil pressure accumulator. On filling of an oil pressure accumulator, the limit operating variable, in particular the limit pressure, is exceeded after a short time, so that the pump can fill the oil pressure accumulator in high-pressure mode.

Finally, the object stated at the outset is also achieved by a method for operating a system according to the invention, comprising the following steps: switching over of the switchover valve, so that the pressure side is connected to the pressure accumulator and the pressure accumulator is filled; deflection of the adjustment cage when the limit operating variable is exceeded and further filling of the pressure accumulator; switching over of the switchover valve, so that the pressure side is connected to the cooling circuit, either after a set or settable time or when a limit pressure in or upstream of the pressure accumulator is exceeded.

The pressure accumulator can be filled in this way by the pump switching to high-pressure mode and thus being able to fill the pressure accumulator, for example, with oil up to 40 bar when the limit operating variable, in particular the limit pressure, is exceeded. After switching over, so that the cooling circuit is again connected to the pressure side, the pressure can in particular drop again within the shortest possible time so that it falls below the limit pressure and the pump is moved back into the base end position, where the pump assumes the low-pressure mode.

Further details and advantageous embodiments of the invention are found in the following description, with reference to which the embodiment of the invention shown in the drawings is described and explained in greater detail. In the drawings:

DETAILED DESCRIPTION

Figure 1:
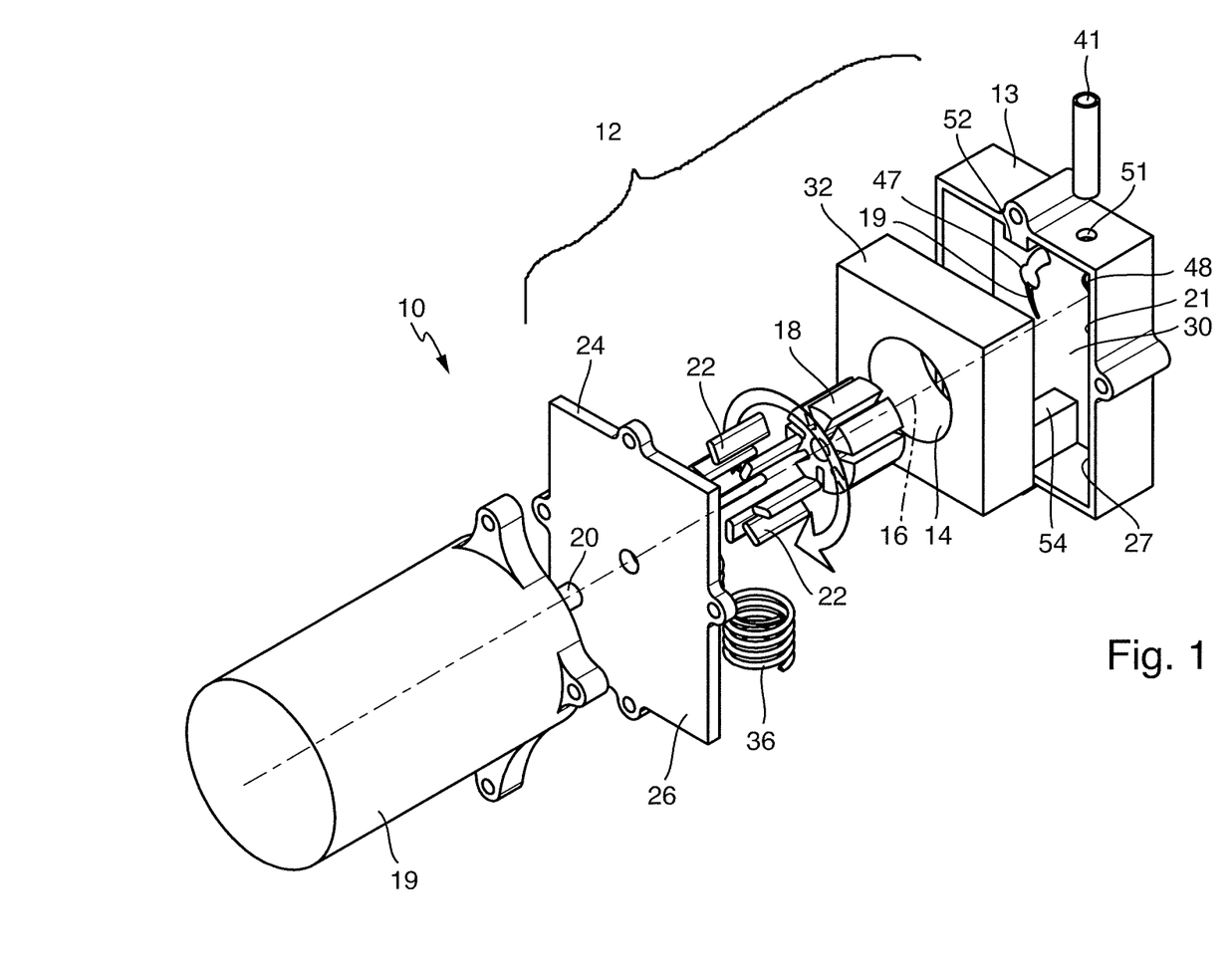
FIG. 1 is an exploded view of an adjustable vane pump according to the invention.

FIG. 1 shows an adjustable vane pump 10, which comprises a two-part housing 12 with a box-shaped base part 13 and a housing cover 26. A rotor 18 arranged so as to be rotatable about a rotor axis 16 is provided in the pump chamber 14 (cf. also FIGS. 4 and 5). To rotate the rotor 18, said rotor is rotationally coupled by a rotor shaft 20. The rotor 18 is used to carry vanes 22 supported movably in a radial direction in the rotor 18. To rotate the rotor 18, an electric motor 19 is screwed onto the housing cover 26, wherein the rotor shaft 20 driven by the electric motor 19 extends through the housing cover 26 to the rotor 18.

In an axial direction, i.e. in the direction of the rotor axis 16, the pump chamber 14 is delimited by a first upper stop surface 24 and by a second, lower stop surface 27 formed parallel to this. The upper stop surface 24 is formed here by the housing cover 26; the lower stop surface 27 is formed by the housing floor 30 of the base part 13.

An adjustment cage 32 that is arranged between the housing cover 28 and the housing floor 30, encloses the rotor 18 and the vanes 22 and is adjustable transversely to the rotor axis 16 is provided in the housing 12.

The adjustment cage 32 as well as the housing cover 28 and the housing floor 30 enclose the pump chamber 14. The adjustment cage 32 and the rotor 18 with the vanes 22 are consequently located, when viewed in the axial direction, between the two stop surfaces 24 and 26.

Figure 4:
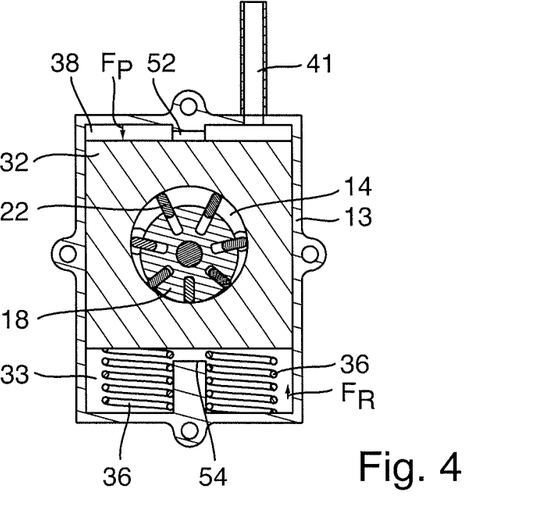
FIG. 4 is a cross section along the line IV-IV according to FIG. 3 with the adjustment cage in the base end position.
Figure 5:
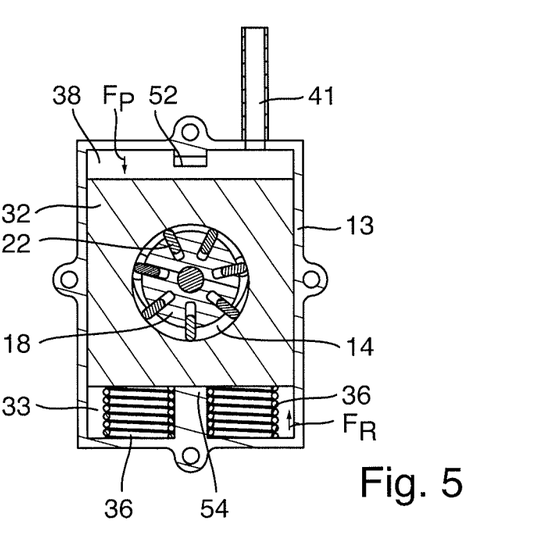
FIG. 5 is a cross section along the line IV-IV according to FIG. 3 with the adjustment cage in the deflection end position.

As is clear in particular from FIGS. 1, 4 and 5, the radially outer vane tips of the vanes 22 rest on the inner wall of the adjustment cage 32. The rotor 18 is arranged eccentrically in the pump chamber 14. The rotor 18 consequently also assumes an eccentric position relative to the adjustment cage.

On rotation of the rotor 18, a pressure gradient arises in the pump chamber 14. The pump 10 consequently comprises a suction side 19 and a pressure side 21.

Figure 2:
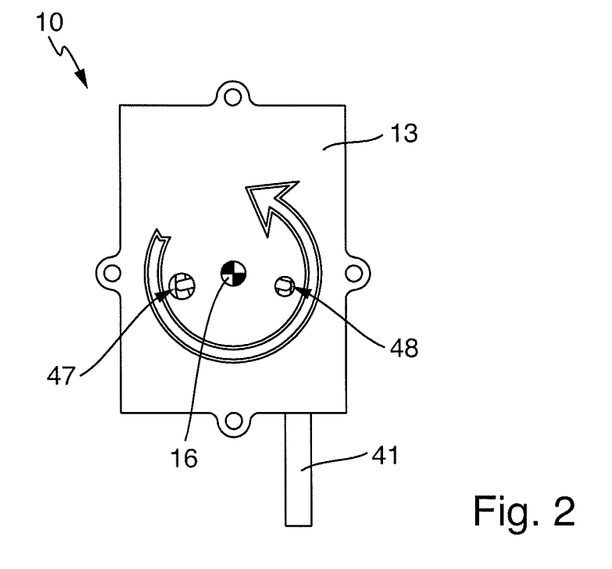
FIG. 2 is a rear view of the adjustable vane pump according to FIG. 1.
Figure 3:
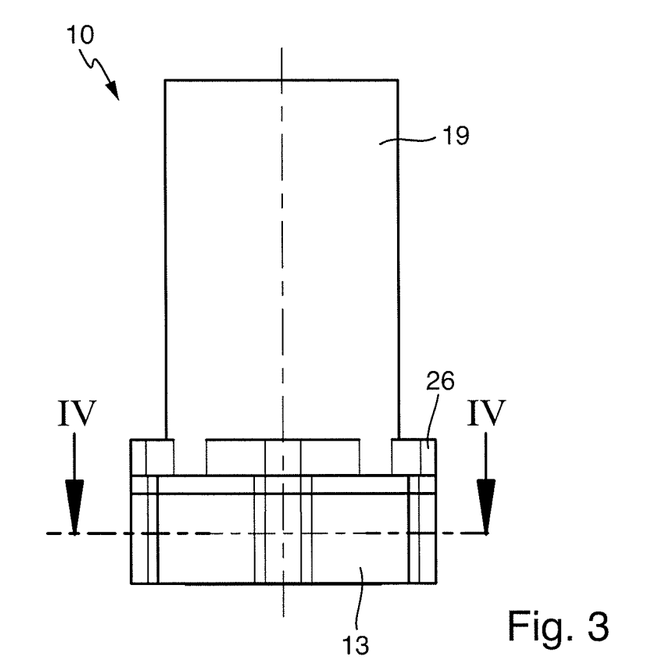
FIG. 3 is a side view of the adjustable vane pump according to FIG. 1.

It is evident from FIGS. 1 and 2 that in the housing floor 30 a suction inlet 47 is provided on the suction side 19 and a pressure outlet 48 that is spatially separated therefrom is provided on the pressure side 21. The suction inlet 47 and the pressure outlet 48 extend in an axial direction through the housing floor 30 into the pump chamber 14. On rotation of the rotor 18 the fluid, in particular transmission or engine oil, is aspirated via the suction inlet 47 and conveyed via the pressure outlet 48 out of the pump 10. The pressure outlet 48 provided in the housing cover 30 opens into a pressure duct 49 (cf. FIGS. 8 and 9). The medium conveyed by the pump 10 can be supplied to the consumer in question via the pressure duct 49.

The adjustment cage 32, the base part 13 and the housing cover 28 delimit a pressure chamber 38 and a restoring element chamber 33, which can be clearly seen in FIGS. 4 and 5. The adjustment cage 32 is formed here so as to be cuboid. Together with the housing 12 two opposing cuboid sides consequently delimit the pressure chamber 38 and the restoring element chamber 33. The other four sides rest on the housing 12 in a sealing manner, so that the pressure chamber 38 is separated from the restoring element chamber 33 in a sealing manner. Suitable seals can also be provided for this purpose. The housing 12 is consequently also used as a guide for the adjustment cage 32.

Figure 6:
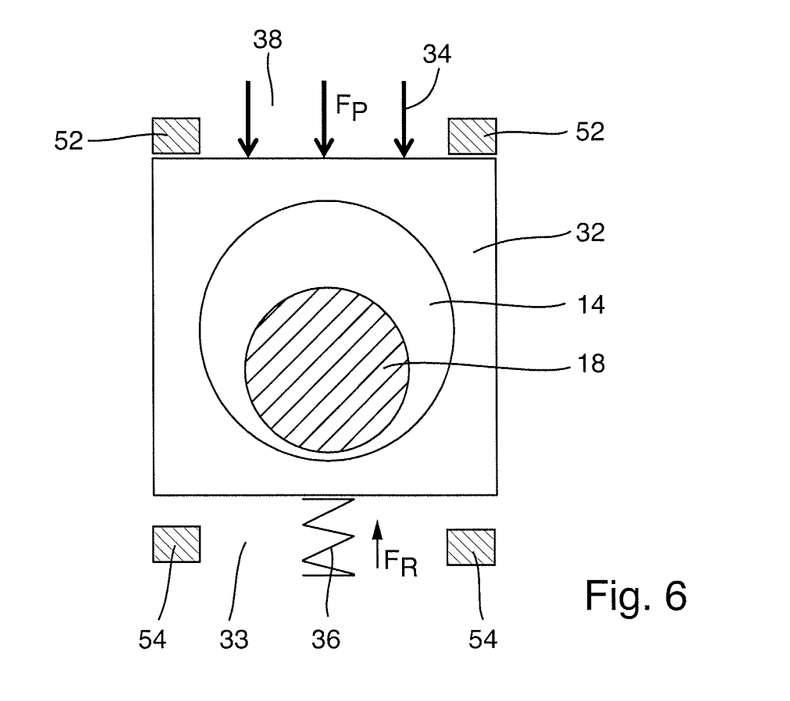
FIG. 6 is a schematic view of the adjustment cage in the base end position.
Figure 7:
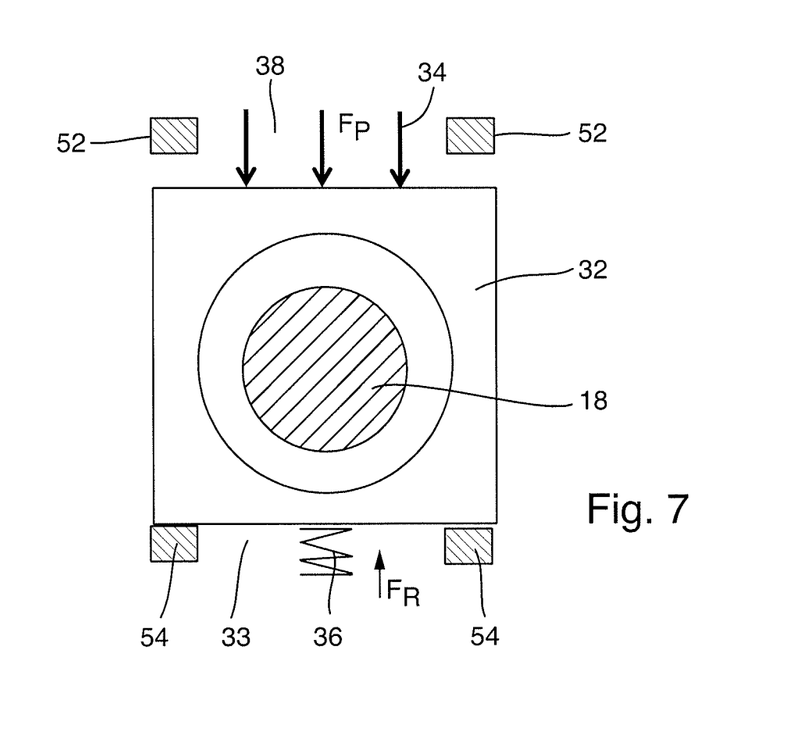
FIG. 7 is a schematic view of the adjustment cage in the deflection end position.

As shown in FIGS. 6 and 7, the adjustment cage 32 can be adjusted transversely to the rotor axis 16 in the direction of the arrow 34.

In the restoring element chamber 33 two restoring elements 36 formed as restoring springs are provided, which push the adjustment cage 32 into the base end position, which is shown in FIGS. 6 and 7.

As is clearly evident from FIGS. 4 and 5, the restoring elements 36 extend perpendicularly to the rotor axis 16. The restoring elements 36 are further supported on the base part 13 on the one hand and on the adjustment cage 32 on the other. The adjustment cage 32 rests, in the base end position, against a first stop 52 on the housing side which is provided on the pressure chamber side and is formed by the base part 13 of the housing 12.

It is evident from FIGS. 6 and 7 that the pressure outlet 48 is fluidically connected to the pressure chamber 38 by a fluid line 41. As a result the pressure side 21 is connected fluidically to the pressure chamber 38. The fluid line extends from the pressure outlet 48 of the vane pump 10 outside the housing 12 to an opening 51 (cf. FIG. 1) in the housing 12 and extends through this opening 51 into the pressure chamber 38. The fluid conveyed by the pump 10, in particular oil, is thus not only pumped from the pressure outlet 48 to a consumer but also flows in the pressure chamber 38. An adjustment of the adjustment cage 32 takes place consequently solely depending on the pressure and the pressure force $F_P$ exerted thereby in the pressure chamber, exerted by the fluid conveyed by the pump 10.

If a limit pressure at the pressure outlet 48 and thus also in the pressure chamber 38 is exceeded, the pressure force $F_P$ exceeds the restoring force $F_R$ of the restoring elements 36 acting in the opposite direction, so that the adjustment cage 32 is deflected. In this case the adjustment cage 32 is moved either abruptly or continuously as the pressure increases in the pressure chamber 38 into a deflection end position, which is shown in FIGS. 5 and 7. In an abrupt adjustment, the deflection end position is assumed substantially immediately when the limit pressure is exceeded. In a continuous adjustment, the adjustment cage 32 is gradually moved into the deflection end position after the limit pressure has been exceeded as the pressure increases in the pressure chamber 38.

In the deflection end position the adjustment cage 32 rests on a second stop 54, which is provided on the restoring chamber side, and is formed by the base part 13 of the housing 12.

Due to adjustment of the adjustment cage 32, the eccentric position of the rotor 18 changes inside the adjustment cage 32 and thus the size of the pump chamber 14 also changes. In the base end position the pump chamber is crescent-shaped (cf. FIG. 6), if this were in the deflection end position (cf. FIG. 7) it would be annular. The conveying capacity of the pump changes accordingly.

In the base end position the conveying volume (displacement) of the pump 10 is approx. 2.5 ccm/rev, while the conveying volume in the deflection end position is 0.5 ccm/rev. The limit pressure here is between 2 and 5 bar, a corresponding counterforce $F_R$ is consequently applied by the setting elements 36. In the deflection end position the pump can apply a pressure of up to 40 bar to a pressure consumer.

Both in the base end position and on deflection of the adjustment cage 32 from the base end position and in the deflection end position, the electric motor 19 is operated at its nominal speed b of approx. 3500 rev/min. As is clearly evident from FIG. 10, the efficiency and thus also the available drive output are maximal at the nominal speed b. As a result, the electric motor 19 is operated only at one operating point b. The change in the pump characteristics, in particular of the conveyed fluid volume per minute, takes place solely via the internal deflection of the adjustment cage 32 from the base end position.

Figure 10:
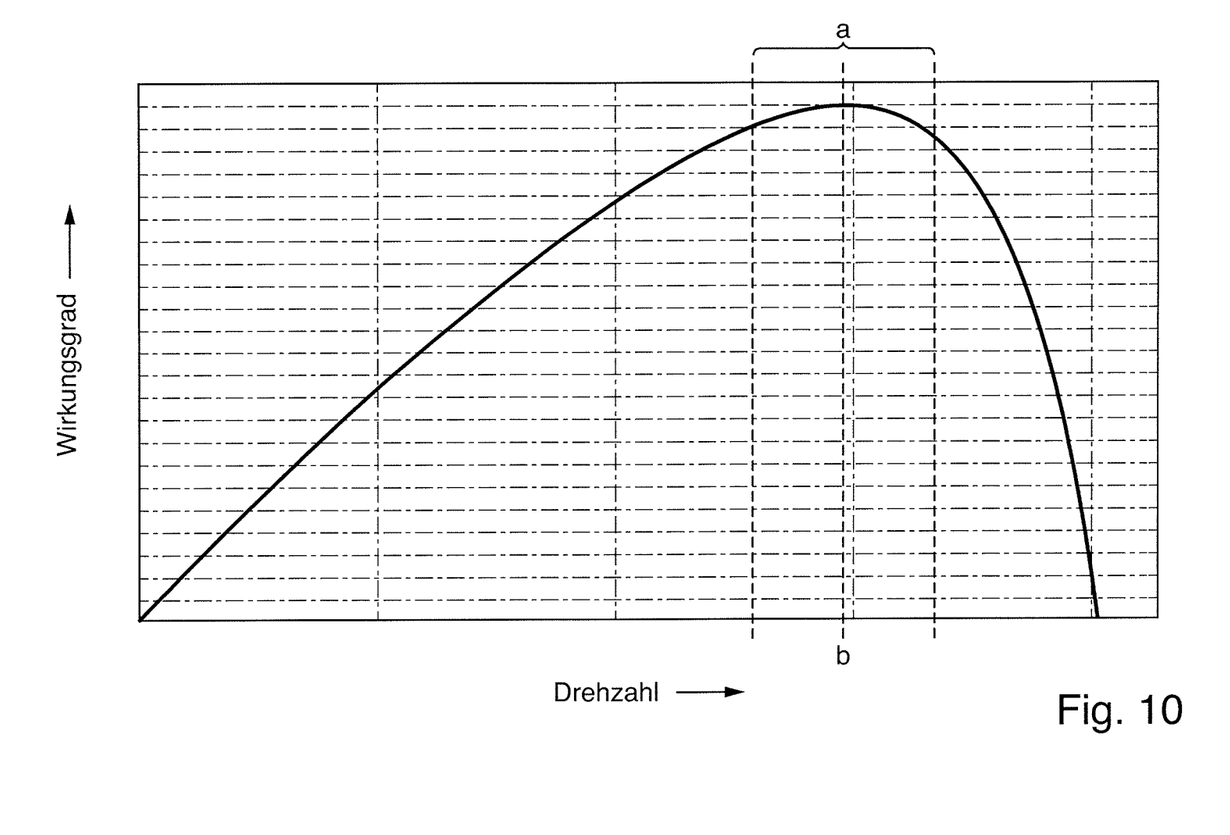
FIG. 10 shows the efficiency of the electric motor for driving the vane pump according to FIG. 1 plotted against its speed.

It would also be conceivable on the other hand to vary the speed quite easily within the nominal speed range a (cf. FIG. 10). In this case the efficiency is only slightly poorer than the maximum efficiency of the electric motor 19. Nevertheless, an adjustment of the speed to the low-pressure or high-pressure mode can take place.

Figure 8:
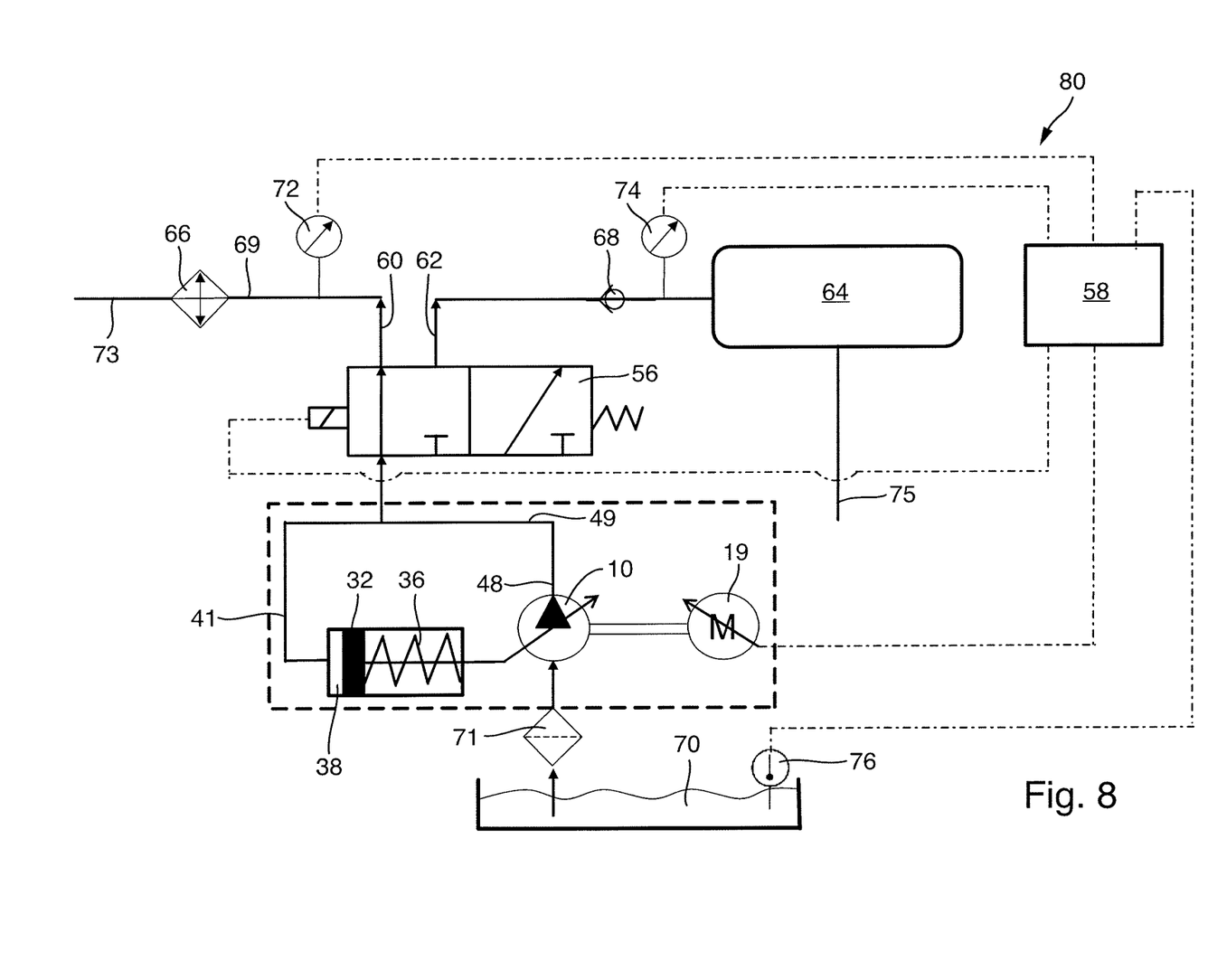
FIG. 8 is a circuit diagram of a system according to the invention with the adjustment cage in the base end position.
Figure 9:
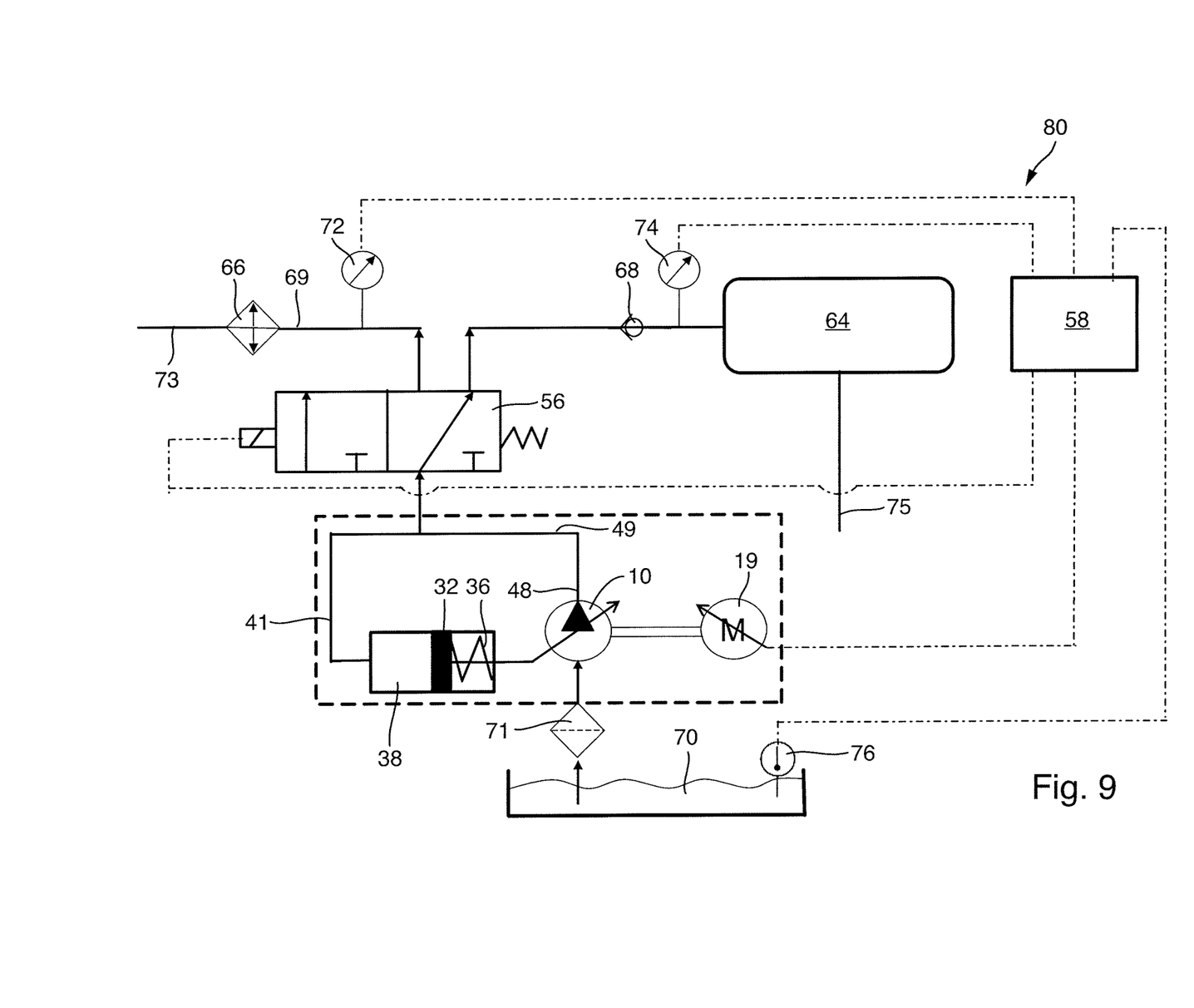
FIG. 9 is a circuit diagram of a system according to the invention with the adjustment cage in the deflection end position.

FIGS. 8 and 9 show the arrangement of the vane pump 10 in a system 80. Here oil is conveyed from an oil sump 70 by the vane pump 10 to the pressure outlet 48 through a filter 71. A magnetic switchover valve 56 is connected downstream of the pressure outlet 48. This can be controlled in the same way as the electric motor 19 for driving the rotor 18 by a control device 58. By means of the switchover valve 56 the pressure side of the vane pump 10 can thus be connected on the one hand to a first pressure connection 60 or on the other hand to a second pressure connection 62 in a fluid-tight manner.

The second pressure connection 62 is connected to a pressure consumer 64 formed as a pressure accumulator. In particular, shift rods 75 in gear units can be moved by the oil of the pressure consumer 64. The first pressure connection 60 discharges into a heat exchanger 66 of a coolant circuit 69.

In the switching position shown in FIG. 8, the first pressure connection 60 is connected fluidically to the vane pump 10. In this case in low-pressure mode a comparatively large quantity of oil is conveyed at low pressure to cool a gear unit 73, for example.

In the fluid connection, shown in FIG. 8, of the cooling circuit to the vane pump 10, it can occur, on cold starting of the vehicle or in the event of soiling of the heat exchanger, that the oil to be conveyed is viscous such that a flow resistance is built up, which causes the limit pressure in the pressure chamber 38 to be exceeded. This causes the adjustment cage 32 to be deflected from the base end position. Due to this, the pump 10 advantageously switches to the high-pressure mode (requirement 2) with low conveying volume and thus builds up a sufficiently high pressure to convey the oil in the cooling circuit. As soon as the oil heats up with the operating duration of the vehicle, the flow resistance drops. Due to this, the pressure falls below the limit pressure in the pressure chamber 38 again, so that the restoring springs 36 move the adjustment cage 32 back into the base end position and thus oil in the low-pressure mode (requirement 1) is conveyed through the cooling circuit 69 to cool the gear unit 73.

According to FIG. 9, the second pressure connection 62 for filling the pressure accumulator 64 is connected in a fluid-tight manner to the vane pump 10 by switching over the switchover valve 56. The switchover takes place at regular set or at settable time intervals. On the other hand, this can also take place when the pressure in the pressure accumulator, measured by the pressure sensor 74, falls below a certain limit value.

The pressure accumulator 64 is then filled. To prevent a flow of oil from the pressure accumulator back into the vane pump 10, a non-return valve 68 is provided here. As the filling level of the pressure accumulator 64 increases, such a high pressure resistance is exerted on the pressure outlet 48 that the limit pressure in the pressure chamber 38 is exceeded. This is because the limit pressure is at approx. 2 bar and the pressure accumulator 64 is filled with oil up to approx. 40 bar. Exceeding the limit pressure causes the adjustment cage 32 to be deflected. The pump characteristics are changed thereby, so that the high-pressure mode (requirement 2) is assumed. The pressure accumulator 64 is topped up at high pressure in this case.

The control device 58 can measure, on the one hand, pressure values of the coolant circuit by means of a sensor 72 or, on the other hand, pressure values upstream of the pressure accumulator by means of the pressure sensor 74 and switch the switchover valve 56 in response to the values measured. Furthermore, the temperature in the oil sump 70 can be measured by the temperature sensor 76 and said sensor can switch the switchover valve 56 depending on these values.

An exemplary and particularly preferred embodiment of the invention then results as follows: to cool and lubricate the gear unit 73, the vane pump 10 is connected to the cooling circuit 69 by switching over the switchover valve 56 and is operated in low-pressure mode (requirement 1). To this end the pump 10 is operated at a pump volume of 2.857 ccm/rev in low-pressure mode at up to approx. 5 bar pump pressure by the electric motor 19 at a speed of 3500 rev/min and a torque of 0.227 Nm in order to convey 10 l/min of fluid. The adjustment cage is located in the base end position in this case. The speed of 3500 rev/min here corresponds to the nominal speed at which the electric motor 19 has its maximum efficiency and thus its maximum available drive output.

To fill the pressure accumulator 64, the vane pump 10 is initially connected thereto and is no longer connected to the cooling circuit 69. On filling of the pressure accumulator 64, a back pressure builds up, which quickly exceeds the limit pressure of 5 bar. As the pump pressure increases, the adjustment cage 32 is then deflected into the deflection end position. In the deflection end position the pump volume is 0.571 ccm/rev. The speed here is identical to the low-pressure mode and is 3500 rev/min. The torque is virtually identical to the low-pressure mode and is 0.364 Nm. In this high-pressure mode (requirement 2) 2 l/min of fluid is conveyed. The pressure accumulator is filled with oil up to approx. 40 bar.

According to the invention the vane pump 10 can consequently be operated at a requirement 1 (high volume flow rate with low pump pressure) and a requirement 2 (low volume flow rate with high pump pressure). The operating point of the electric motor 19 does not have to be changed in this case. The vane pump 10 is instead operated with the same operating point of the electric motor 19 for both requirement 1 and requirement 2.

The invention claimed is:

1. An adjustable vane pump with a suction side and a pressure side, with a housing and with a rotor, which is supported in the housing so as to be rotatable about a rotor axis and carries at least one vane supported movably in a radial direction, wherein the housing comprises a housing floor and a housing cover transversely to the rotor axis, and wherein an adjustment cage that is arranged between the housing floor and the housing cover, encloses the rotor and the vane and is adjustable transversely to the rotor axis is provided in the housing, characterized in that the housing and the adjustment cage delimit a pressure chamber connected fluidically to the pressure side, wherein a restoring element is provided, which pushes the adjustment cage into a base end position, and wherein the adjustment cage is deflected from the base end position if a limit operating variable is exceeded in the pressure chamber, characterized in that the rotor is driven by an electric motor formed as a rotor drive, wherein the rotor drive is operated in a nominal speed range of 3000 to 4000 revolutions/min, both when the adjustment cage is in the base end position and when the adjustment cage is deflected from the base end position.

2. The vane pump according to claim 1, characterized in that the adjustment cage is deflected into a deflection end position on exceeding of the limit operating variable either abruptly or continuously as the limit operating variable increases.

3. The vane pump according to claim 2, wherein the rotor drive operates at a speed and a torque, wherein at least one of the speed and the torque of the rotor drive are identical in the base end position and the deflection end position.

4. The vane pump according to claim 2, wherein in the deflection end position a pressure of between 30 and 60 bar is applied to a pressure consumer.

5. The vane pump according to claim 1, characterized in that the restoring element is positioned in at least one of: extends perpendicularly to the rotor axis and supported on the housing on the one hand and on the adjustment cage on the other.

6. The vane pump according to claim 1, characterized in that the housing and the adjustment cage delimit the pressure chamber and an opposing restoring element chamber in a sealing manner.

7. The vane pump according to claim 1, characterized in that the housing has a pressure outlet connected to the pressure side, wherein the pressure outlet is fluidically connected to the pressure chamber by a fluid line.

8. The vane pump according to claim 1, characterized in that the adjustment cage rests in the base end position and in a deflection end position, wherein, in the base end position, the adjustment cage rests on a first stop on the housing side and in that the adjustment cage rests, in the deflection end position, on a second stop on the housing side opposite the first stop.

9. The vane pump according to claim 1, characterized in that the adjustment cage is formed as a cuboid and in that the housing is formed in two parts with a box-shaped base part and a plate-shaped housing cover.

10. The vane pump according to claim 1, characterized in that the limit operating variable is formed as a limit pressure.

11. The vane pump according to claim 10, wherein the vane pump has a deflection end position and is characterized in that the limit pressure is between 1 and 7 bar, and in that the deflection end position is reached at a pressure of from 0.5 to 10 bar above the limit pressure.

12. An adjustable vane pump, comprising: a suction side and a pressure side, with a housing and with a rotor, which is supported in the housing so as to be rotatable about a rotor axis and carries at least one vane supported movably in a radial direction, wherein the housing comprises a housing floor and a housing cover transversely to the rotor axis, and wherein an adjustment cage that is arranged between the housing floor and the housing cover, encloses the rotor and the vane and is adjustable transversely to the rotor axis is provided in the housing, characterized in that the housing and the adjustment cage delimit a pressure chamber connected fluidically to the pressure side, wherein a restoring element is provided, which pushes the adjustment cage into a base end position, and wherein the adjustment cage is deflected from the base end position if a limit operating variable is exceeded in the pressure chamber, characterized in that the rotor is driven by an electric motor formed as a rotor drive, wherein the rotor drive is operated in a nominal speed range of 3000 to 4000 revolutions/min, both when the adjustment cage is in the base end position and when the adjustment cage is deflected from the base end position, further characterized in that the rotor drive is operated at the nominal speed of 3500 rev/min so that the rotor drive has the maximum efficiency.

13. An adjustable vane pump, comprising a suction side and a pressure side, with a housing and with a rotor, which is supported in the housing so as to be rotatable about a rotor axis and carries at least one vane supported movably in a radial direction, wherein the housing comprises a housing floor and a housing cover transversely to the rotor axis, and wherein an adjustment cage that is arranged between the housing floor and the housing cover, encloses the rotor and the vane and is adjustable transversely to the rotor axis is provided in the housing, characterized in that the housing and the adjustment cage delimit a pressure chamber connected fluidically to the pressure side, wherein a restoring element is provided, which pushes the adjustment cage into a base end position, and wherein the adjustment cage is deflected from the base end position if a limit operating variable is exceeded in the pressure chamber, further characterized in that the adjustment cage is deflected into a deflection end position on exceeding of the limit operating variable either abruptly or continuously as the limit operating variable increases, wherein the rotor drive operates at a speed and a torque, wherein at least one of the speed and the torque of the rotor drive are identical in the base end position and the deflection end position, wherein the vane pump includes a conveying volume, wherein the conveying volume in the base end position is 1.5 to 4 ccm/rev, and in that the conveying volume in the deflection end position is 0.2 to 1.4 ccm/rev, and in that the conveying volume in the base end position is 5 to 20 1/min, and in that the conveying volume in the deflection end position is 0.5 to 4 1/min.

\* \* \* \* \*